United States Patent [19]

Ueda

[11] Patent Number: 4,784,929

[45] Date of Patent: Nov. 15, 1988

[54] PHOTOSENSITIVE MEMBER WITH HYDRAZONE AND/OR AZINE CHARGE TRANSPORT MATERIAL

[75] Inventor: Hideaki Ueda, Kawanishi, Japan

[73] Assignee: Minolta Camera Kabushiki Kaisha, Osaka, Japan

[21] Appl. No.: 51,619

[22] Filed: May 20, 1987

[30] Foreign Application Priority Data

May 21, 1986 [JP] Japan .................................. 61-116677

[51] Int. Cl.[4] .......................... G03G 5/09; G03G 5/14
[52] U.S. Cl. ............................. 430/59; 430/81,83,95; 430/96
[58] Field of Search ....................... 430/59, 81, 83, 90, 430/95, 96

[56] References Cited

U.S. PATENT DOCUMENTS 4,399,208  8/1983  Takasu et al. .................... 430/59
4,420,548  12/1983  Sakai et al. ...................... 430/59

FOREIGN PATENT DOCUMENTS 59-170843  9/1984  Japan ................................ 430/59

Primary Examiner—Roland E. Martin
Attorney, Agent, or Firm—Burns, Doane, Swecker & Mathis

[57] ABSTRACT

The present invention relates to a photosensitive member containing a specific hydrazone compound or a specific azine compound for a charge transporting agent, which is improved in a sensitivity, chargeability, resistivity for repeated use and stability.

8 Claims, 1 Drawing Sheet

PHOTOSENSITIVE MEMBER WITH HYDRAZONE AND/OR AZINE CHARGE TRANSPORT MATERIAL

BACKGROUND OF THE INVENTION

The present invention relates to a photosensitive member containing a low molecular weight organic compound.

To practice electrophotography it is generally known to introduce a direct method which comprises formation of an electrostatic latent image on the surface of the photosensitive layer of a photosensitive member by electrification and exposure, a process for making said image visible by development with a developer, and formation of copied images from said visible image which is fixed as it is directly to the photosensitive member, or a toner image transfer method which comprises transferring a visible image on a photosensitive member onto a transfer paper such as that of an ordinary paper and forming by fixing the transferred image its copied image, or a latent image transfer method which comprises transferring an electrostatic latent image from a photosensitive member onto a transfer paper and developing and fixing said electrostatic latent image on said transfer paper.

For the photoconductive material forming the photosensitive layer of a photosensitive member in the particular area of electrophotography dealt with herein, it is known that an inorganic photoconductive material such as selenium, cadmium sulfide or zinc oxide has been in conventional use in the past. Such photoconductive materials have advantages in that they may be charged to an appropriate potential in the dark, the loss of electrical charge in the dark is limited, the electric charge can be dissipated fast with irradiation of light, and so on. However, on the other hand, they have disadvantages as follows. For example, a selenium photosensitive member costs high when produced, and its inadequate resistivity to heat and mechanical impact necessitates caution in handling. A photosensitive member based on cadmium sulfide and that based on zinc oxide are not stable in sensitivity when placed in a highly humid environment and, moreover, since the colorant added as a sensitizer to them undergoes deterioration in electricification caused by corona charge and also color fading caused by exposure to light, they are lacking in stability of properties in long periods of use.

Consideration has also been given to the use of various organic photoconductive polymers, including polyvinyl carbazole. Although such polymers have advantages over the inorganic photoconductive materials in the foregoing description with respect to film forming property, lightness in weight, etc., they are inferior to the inorganic products when the sensitivity, durability and stability to change of environmental conditions are compared.

An organic photoconductive compound of low molecular weight also has an advantage in that the property of the film formed and the electrophotographic property can be controlled by adopting the right kind of the right composition ratio regarding the binder used in combination, but its combination use with a binder requires it to have a high compatibility with the binder.

A photosensitive member consisting of such an organic photoconductive compound of high or low molecular weight dispersed in a resin binder has such a defect as large residual potential and low sensitivity because of many traps for the carrier. To solve this problem it has been proposed to incorporate a charge transporting material into an organic photoconductive compound.

Many organic compounds have been named for the use as charge transporting materials, but the practice brings many problems to the fore. For example, the U.S. Pat. No. 3,189,447 described the usee of 2,5-bis(P-diethylaminophenyl)-1,3,4,-oxadiazole, whose compatibility with binders, however, is low and the material tends to separate in crystals. The U.S. Pat. No. 3,820,989 described the use of a diarylalkane derivative, which has satisfactory compatibility with binders but the repeated use causes changein sensitivity. Thy hydrazone compound in the Japanese Patnet KOKAI No. 59143/1979 is fairly satisfactory as regards the residual potential, but the use shows defects with resect to sensitivity, chargeability and the properties affected by repeated use.

It has thus been almost impractible to introduce a low molecular weight organic compound as a component of a photosensitive member to bring about a satisfactory effects.

SUMMARY OF THE INVENTION

The present invention relates to a photosensitive member for electrophotography, which contains an specific hydrazone compound or an azine compound represented by the following formula as a charge transporting material.

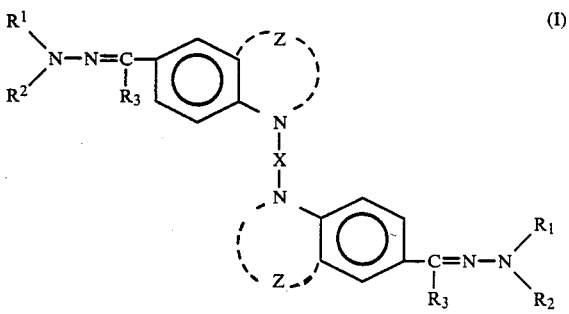

(wherein $R_1$ and $R_2$ independently represent any of an alkyl group, aralkyl group, aryl group and heterocyclic group, where each group may have a substituent; $R_1$ and $R_2$ may combinedly form a ring. $R_3$ represents any of a hydrogen atom, alkyl group, aralkyl group, aryl group and heterocyclic group, where the aralkyl group, aryl group and heterocyclic group may have a substituent; X is represented by the formula:

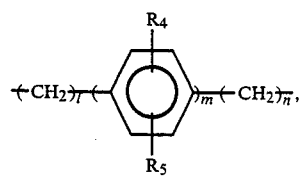

wherein $R_4$ and $R_5$ independently represent any of a hydrogen atom, halogen atom, alkyl group, alkoxy group, aralkyl group, aryl group, aryloxy group, and aralkyloxy group, where each group may have a substituent; l and n independently represent an integer 0 through 6; m represents an integer 0 through 2; and Z represents a group forming a heterocyclic group together with a nitrogen atom, which may have a substituent.)

General formula:

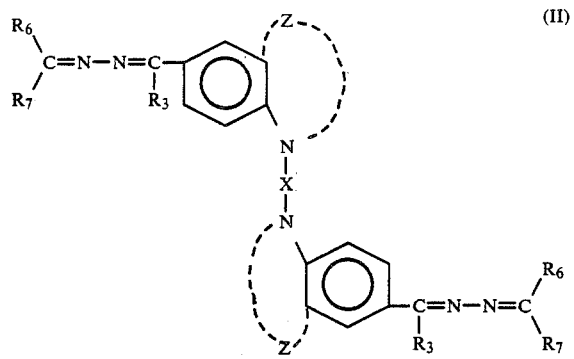

(Wherein $R_3$, X and Z are the same as in (I); $R_6$ and $R_7$ independently represent any of a hydrogen atom, alkyl group, aryl group and heterocyclic group, where each group may have a substituent; and $R_6$ and $R_7$ may combinedly form a ring.)

These hydrazone or azine compound are excellent in a compatibility with binders and give a charge transportability. The obtained photosensitive member shows a high sensitivity, good chargeability, resistivity for repeated use and stability.

BRIEF DESCRIPTION OF THE DRAWINGS

FIGS. 1, 4 and 5 show the structure of a photosensitive member of the dispersion type, which consists of an electroconductive substrate overlaid with a photosensitive layer; and FIGS. 2 and 3 show the structure of a photosensitive member of the function-separating type, wherein a charge-generating layer and a charge-transporting layer, forming separate layers, overlie an electroconductive substrate.

DETAILED DESCRIPTION OF THE INVENTION

Figure 1:
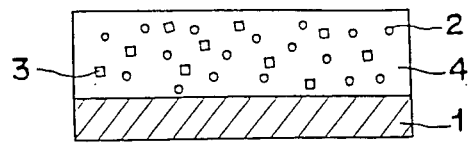
FIGS. 1 through 5 schematically show the photosensitive members of the present invention.

The present invention provides a photosensitive member for electrophotography, which contains a hydrozone compound having a good compatibility with binders and a good charge transporting ability, and whereby a high sensitivity, a good chargeability, minimized deterioration through fatigue accompanying repeated use, and stability of electrophotographic properties are all ensured.

The present invention has accomplished the above-mentioned object by introduction of a specific hydrazone compound or azine compound.

A photosensitive member provided according to the present invention contains a hydrazone compound or azine compound represented by the general formula (I) or (II).

General formula:

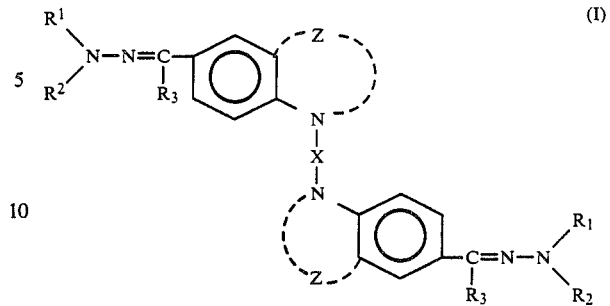

(wherein $R_1$ and $R_2$ independently represent any of an alkyl group, aralkyl group, aryl group and heterocyclic group, where each group may have a substituent; $R_1$ and $R_2$ may combinedly form a ring; $R_3$ represents any of a hydrogen atom, alkyl group, aralkyl group, aryl group, and heterocyclic group, where each group may have a substituent; X is represented by the formula:

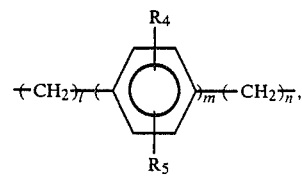

wherein $R_4$ and $R_5$ independently represent any of a hydrogen atom, halogen atom, alkyl group, alkoxy group, aralkyl group, aryl group, aryloxy group, and aralkyloxi group, where each group may have a substituent; l and n independently represent any of the integers 0-6 and m any of the integers 0-2; and Z represent a group forming a heterocyclic group together with a nitrogen atom, which may have a substituent.)

General formula:

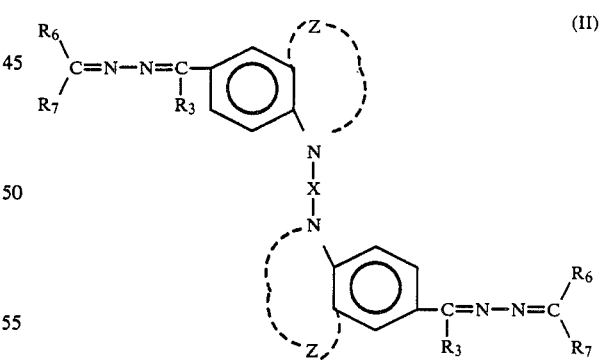

(wherein, $R_1$, $R_2$, $R_3$, X, Z are used in the same denotation as in (I); $R_6$ and $R_7$ independently represent any of a hydrogen atom, alkyl group, aryl group and heterocyclic group, where each group may have a substituent; $R_6$ and $R_7$ may combinedly form a ring.)

In the preferable enamine compounds of the present invention, $R_1$ and $R_2$ are independently phenyl, methyl, ethyl, benzyl, methoxy phenyl and ethoxy phenyl which may have a substituentexcepting that the both are hydrogen atoms; the formula

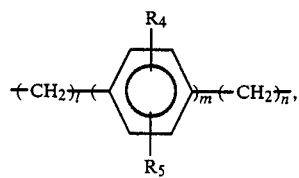

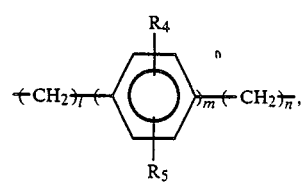

is a group selected from the group consisting of 1,6-quinolinyl group, 1,5-indolinyl group, 1,5-benzoimidazolyl group, indolyl group, quinolyl group, quinazolinyl group, quinoxanilyl group, 3H-indolyl group and the like; m is 0 or 1, and in the case of m being 1, n and l are each 1, and in the case of m being 0, l plus n is 2–6; and $R_3$ is hydrogen atom or a lower alkyl group.

In the preferable azine compounds of the present invention, $R_6$ and $7_2$ are independently phenyl, methyl, ethyl, benzyl, methoxy phenyl and ethoxy phenyl, dialkylaminophenyl, diphenylaminophenyl, N-methyl benzothiazolinyl, N-methyl benzoxazolinyl group, which may have a substituent, excepting that both are hydrogen atoms; the formula is a group selected from the group consisting of 1,6-quinolinyl group, 1,5-indolinyl group, 1,5-benzoimidazolyl group, indolyl group, quinolyl group, quinazolinyl group, quinoxanilyl group, 3H-indolyl group and the like; m is 0 or 1, and in the case of m being 1, n and l are each 1, and in the case of m being 0, n plus l is 2–6; and $R_3$ is hydrogen atom or a lower alkyl group.

Hydrazone compounds preferred to as embodiments of the present invention, represented by said general formula (I) are shown below with formulas (1) through (15) and azine compounds likewise preferred to and represented by said general formula (II) are shown with formulas (16) through (27), but these are shown with no significance of restricting the embodiments of the invention.

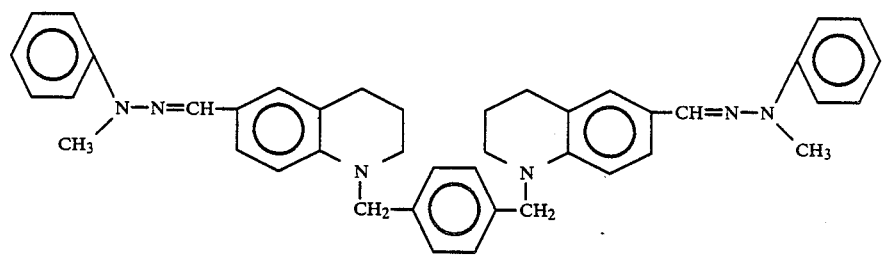

(1)

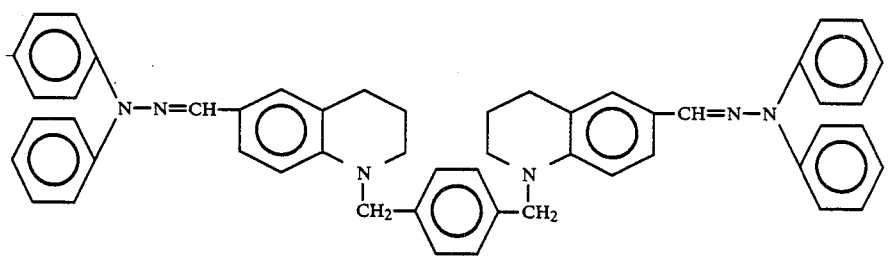

(2)

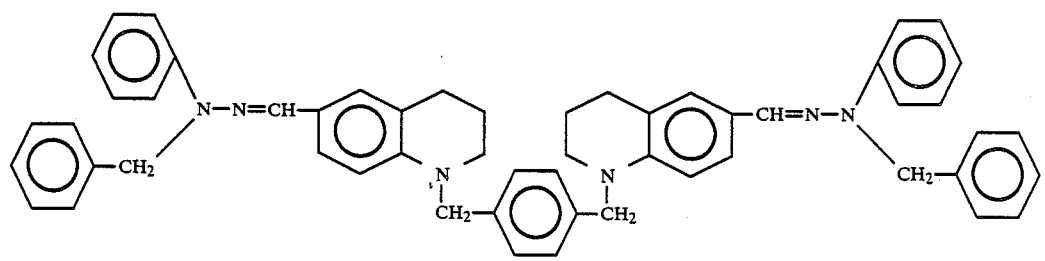

(3)

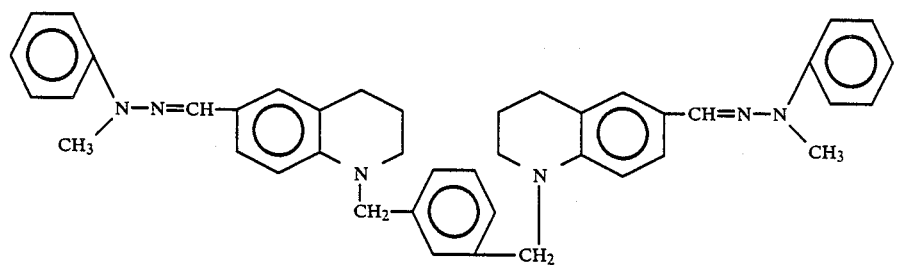

(4)

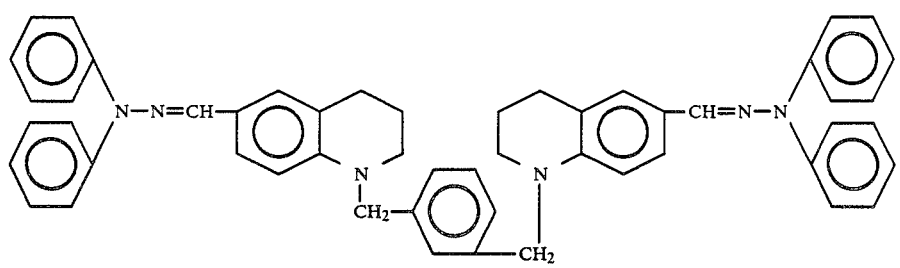
(5)
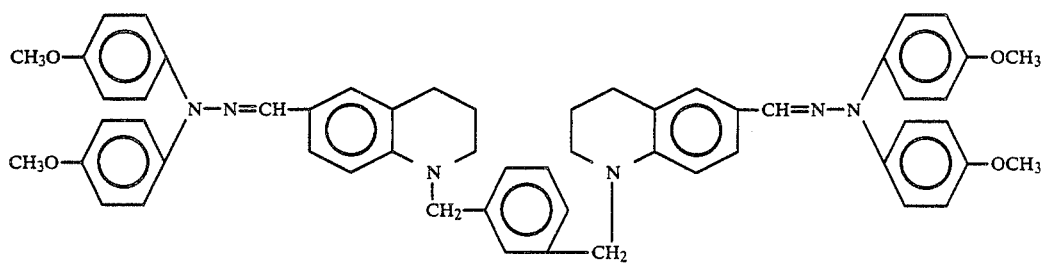
(6)
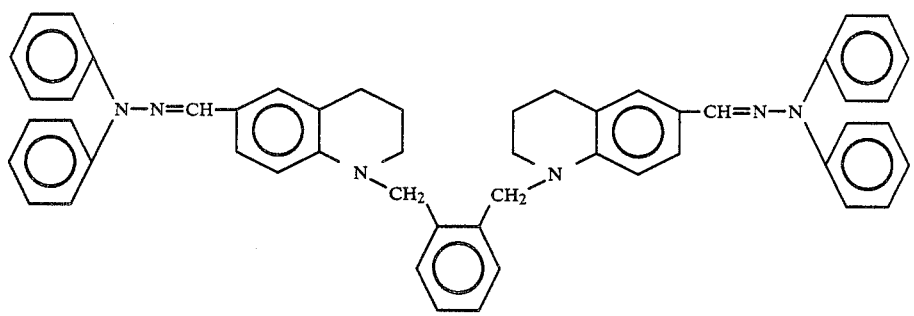
(7)
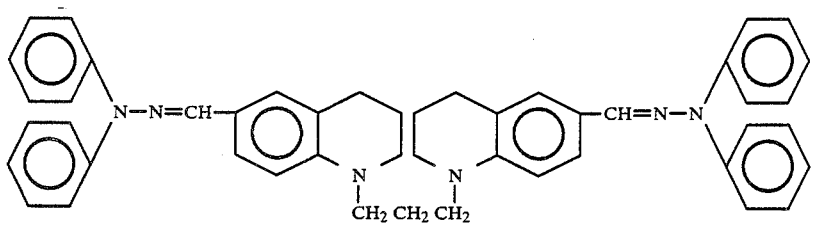
(8)
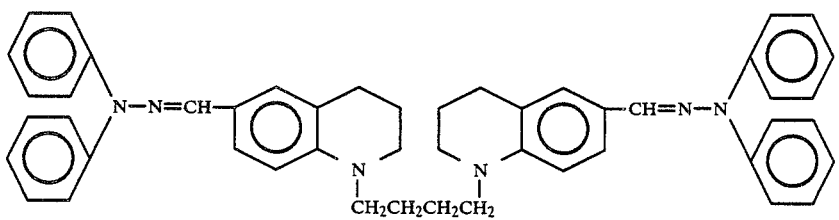
(9)
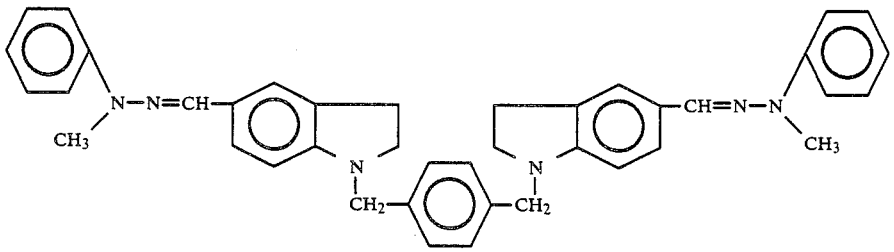
(10)

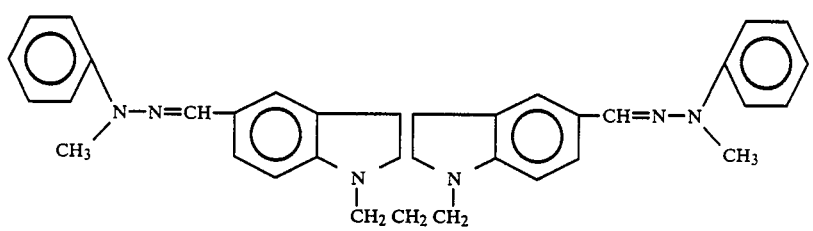
(11)
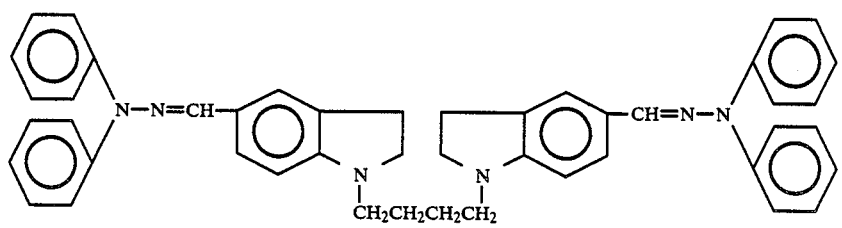
(12)
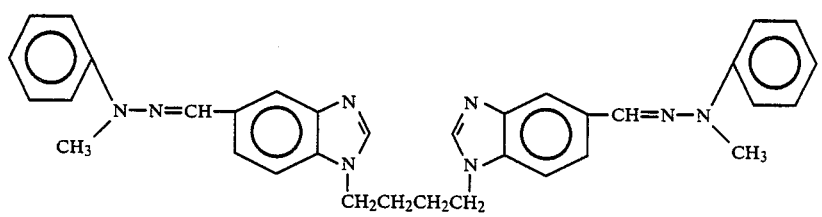
(13)
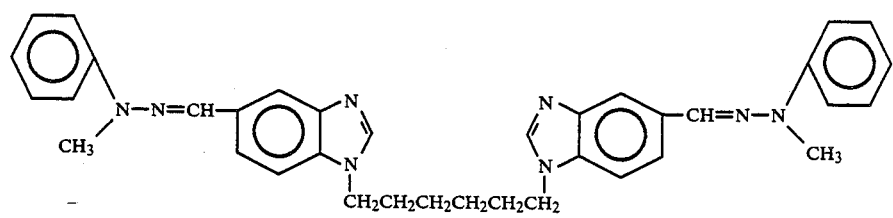
(14)
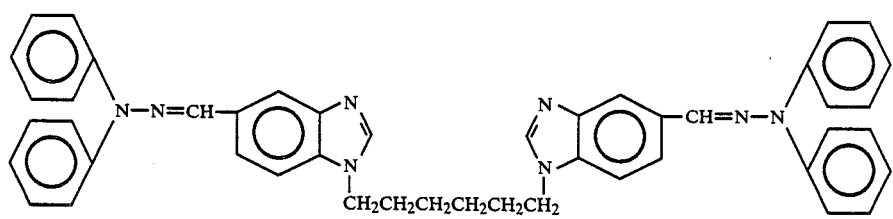
(15)
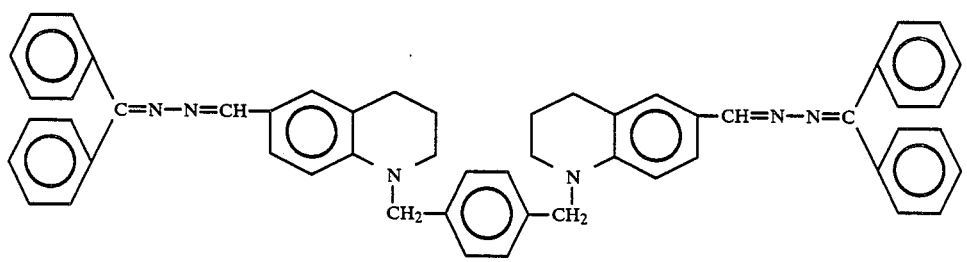
(16)
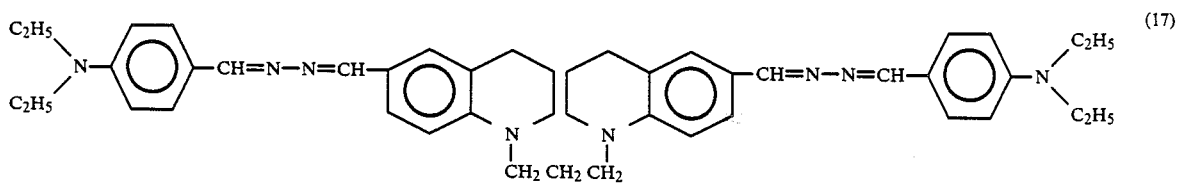
(17)

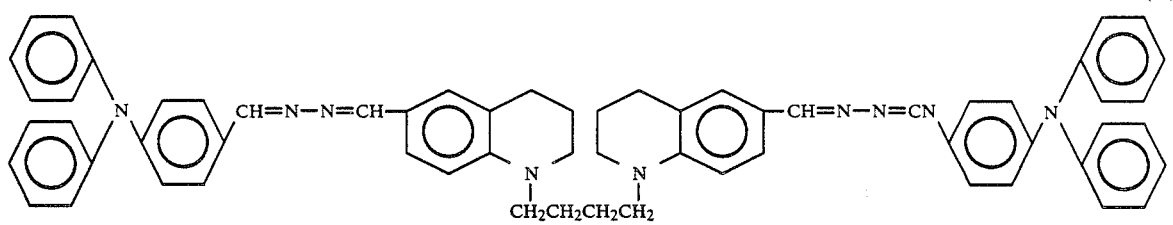
(18)
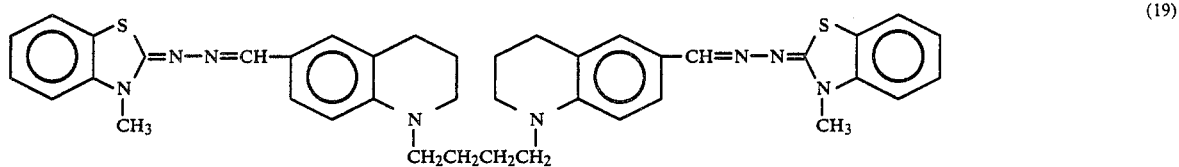
(19)
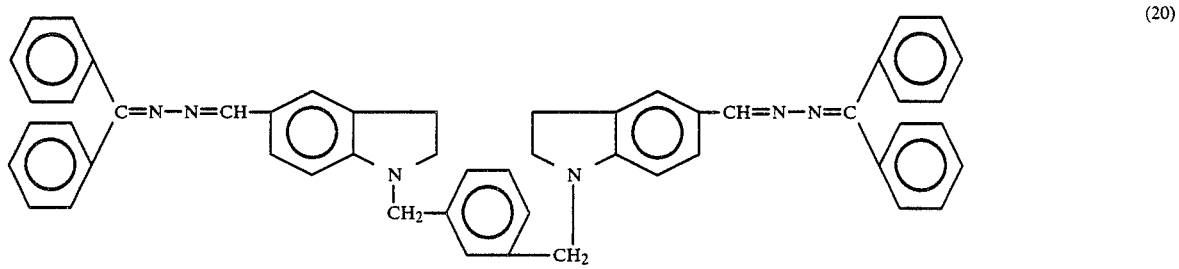
(20)
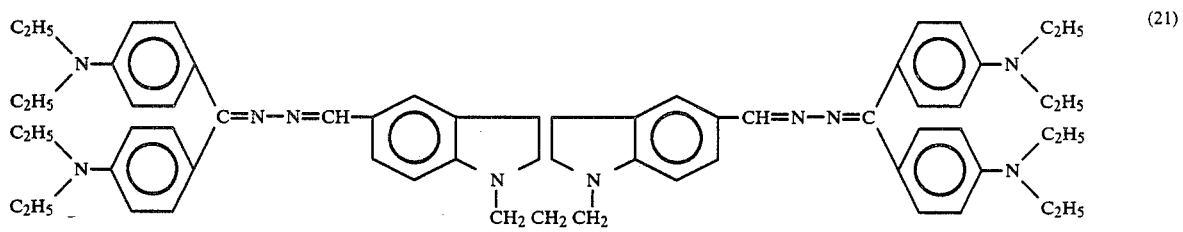
(21)
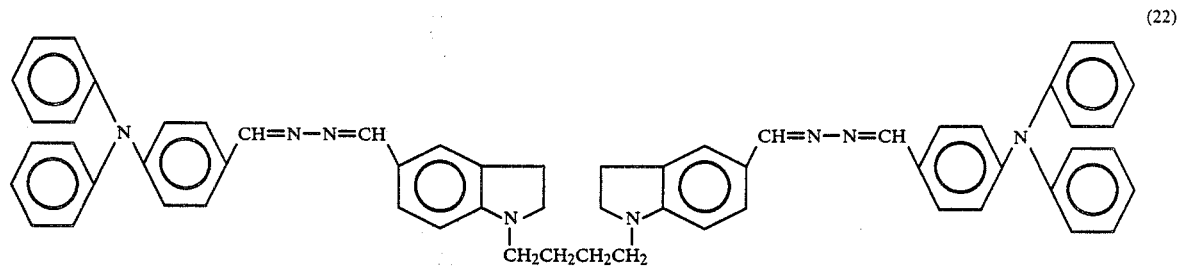
(22)
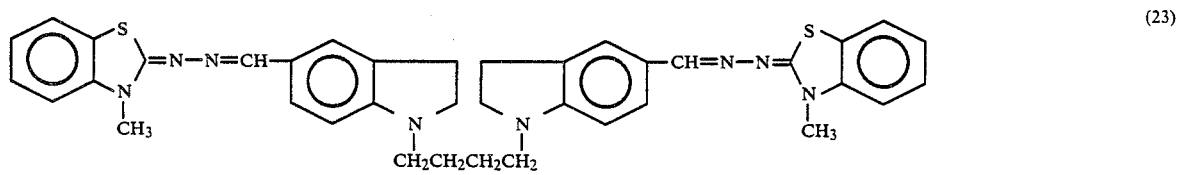
(23)
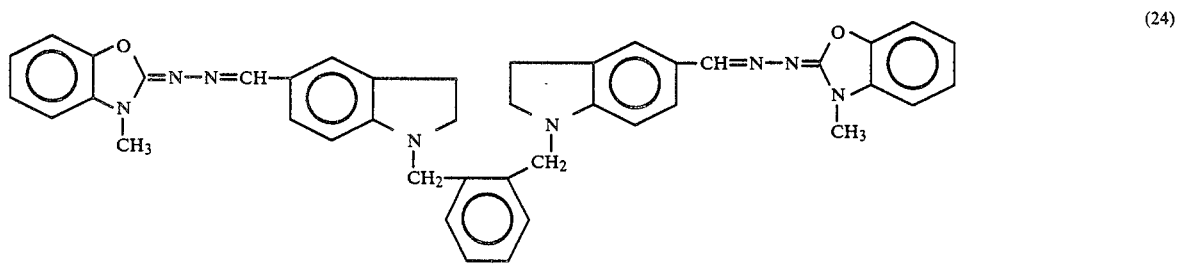
(24)

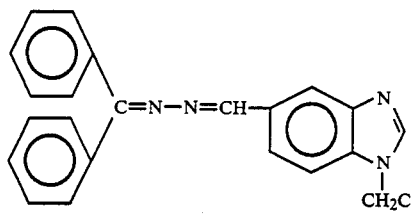 (25)

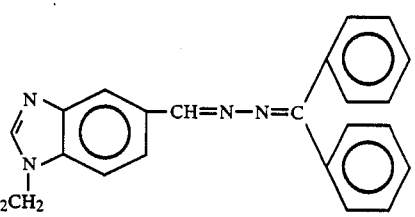

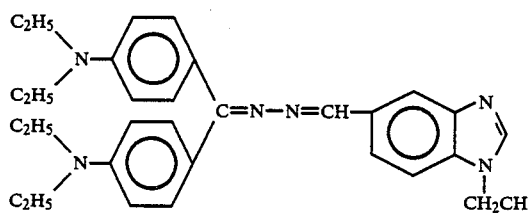 (26)

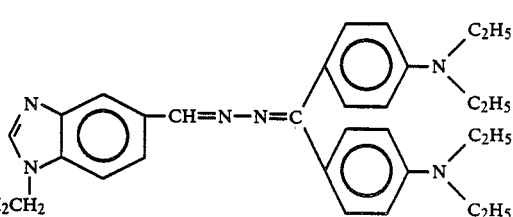

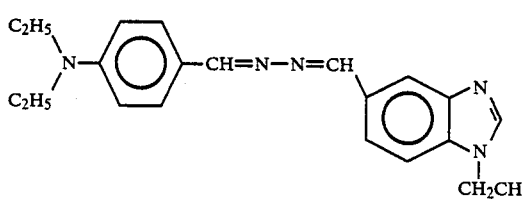 (27)

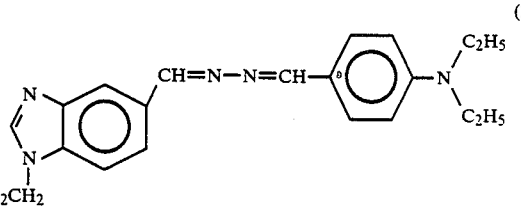

A hydrazone compound embodying the present invention can be synthesized by a publicly known method: for example, such a hydrazone compound can be easily formed by reacting a diketone compound represented by a general formula (III)

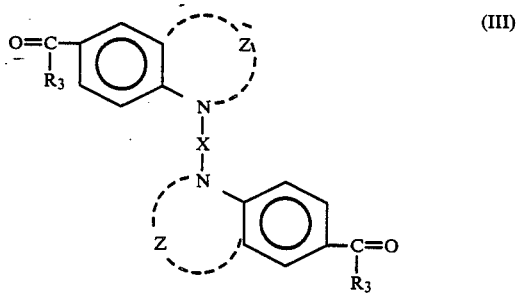 (III)

(wherein $R_3$, X and Z are the same as in the formula (I)) with a hydrazine compound represented either by a general formular (IV)

 (IV)

(wherein $R_1$ and $R_2$ are the same as in the formula (I) or by a general formular (V)

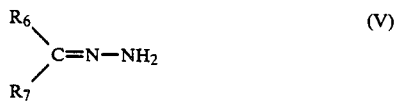 (V)

(wherein $R_6$ and $R_7$ are the same as in the formula (I)) in the manner of condensatio reaction involving reflux by heating in a solvent of any of or a mixture of an alcohol such as methanol or ethanol, or tetrahydrofuran, n,n-dimethylformamide, acetic acid, or the like and in the presence of, as condensation agent, a tertiary amine such as pyridine or triethylamine, or an inorganic acid, or an organic acid such as acetic acid. In other words, a hydrazone compound represented by the general formula (I) can be obtained by condensation reaction of a diketone compound represented by the general formula (III) with a hydrazone compound represented by the general formula (IV), and a hydrazone compound represented by the general formula (II) can be obtained by condensation reaction of a diketone compound represented by the general formula (III) with a hydrazone compound represented by the general formula (V).

A hydrazone compound and azine compound in the embodiments of the present invention, represented by the general formulae (I) and (II), are similar to each other structurally, but they are different in that an azine compound represented by the general formula (II) has one more unsaturated carbon atom which is bonded to nitrogen than the hydrazone compound represented by the general formula (I). The presence of unsaturated carbon atoms in larger numbers in photosensitive members helps to absorb light of long wavelengths and accordingly has an effect to prevent light fatigue. Except for this effect, the compounds represented by the general formulae (I) and (II) are similar to each other in electrophotographic properties including charge transporting ability, chargeability, and photosensitivity, the two comparable compounds showing excellent properties.

In FIG. 1 through FIG. 5, there are schematically shown photosensitive members based on hydrazone compounds as embodiments of the present invention.

FIG. 1 shows a photosensitive member wherein a compound of the invention is used for the charge transporting material; a photosensitive layer (4) which consists of a charge transporting material (2) and a photoconductive material (3) both incorporated in a binder is formed on a substrate (1).

Figure 2:
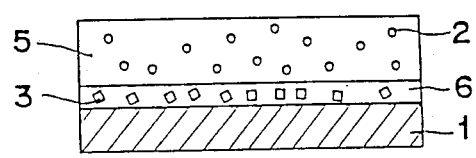

FIG. 2 shows a photosensitive member of the function-separating type, whose photoconductive layer consists of a charge-generating layer (6) and a charge-transporting layer (5). The charge-transporting layer (5) is formed on the surface of the charge-generating layer (6). A hydrazone compound of the present invention is incorporated in the charge-transporting layer (5).

Figure 3:
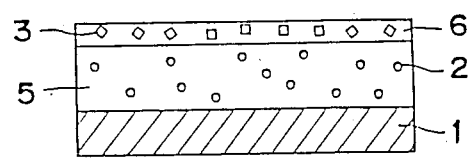

FIG. 3 also a photosensitive layer of the function-separating type, having a charge-generating layer (6) and a charge-transporting layer (5), but, unlike FIG. 2, the charge-generating layer (6) is formed on the surface of the charge-transporting layer (5).

Figure 4:
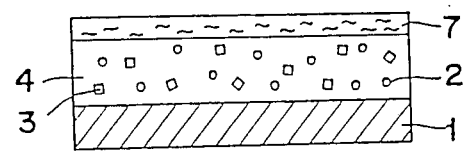

FIG. 4 is a photosensitive member which consists of the same photosensitive member as FIG. 1 whose suarface is covered with a surface-protective layer (7). the photosensitive layer (4) can be altered to the function-separating type by separating it into a charge-generating layer (6) and a charge-transporting layer (5).

Figure 5:
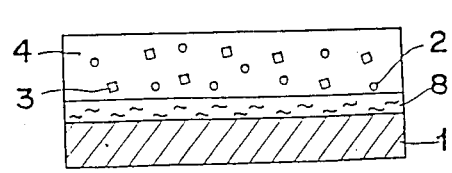

FIG. 5 shows an example of a photosensitive member wherein there is an intermediate layer (8) between the substrate (1) and the photosensitive layer (4). An intermediate layer (8) can be formed for the purpose of improving adhesivity, coating property, and charge injecting property from the substrate into the photoconductive layer as well as protecting the substrate. The materials suitable for the intermediate layer are polyimide resin, polyester resin, polyvinyl butyral resin, casein, etc. The photosensitive layer of this type of photosensitive member can also be altered to the function-separating type.

In the practice of this invention a photosensitive member is produced by dissolving or dispersing a hydrazone compound together with a binder in a suitable solvent, with addition thereto of a photoconductive material together with an electron-attractive compound, or a sensitizing dye, or a pigment where necessary, and by applying a coating preparation thereby obtained to an electroconductive substrate, followed by drying, so as to form a photosensitive layer with a film thickness of ordinarily 5–30 μm, preferably 6–20 μm.

A photosensitive member of the function-separating type, which consists of an electroconductive substrate overlaid with a charge-generating layer and a charge-transporting layer as shown in FIG. 2, is produced by applying aphotoconductive material to an electroconductive substrate in the manner of vacuum deposition or in the manner of coating with a coating preparation obtained by dissolving the photoconductive material in a suitable solvent or by dispersing it in a solution of a binder resin where necessary, following by drying, so as to form a charge-generating layer, and by overlaying the charge-generating layer with a coating prepared by dissolving a hydrazone compound and a binder in a suitable solvent, followed by drying, so as to form a charge-transporting layer. The charge-generating layer thus produced should have a thickness of 4 μm or less, preferably 2 μm or less, and the charge-transporting layer a thickness in the range 3–30 μm, preferably 5–20 μm. It is suitable for the hydrazone compound contained in the charge-transporting layer to have a proportion of 0.02–2 parts by weight, preferably 0.03–1.3 parts by weight, against one part by weight of the binder. The charge-transporting material permits the additional use of other charge-transporting materials in combination. There is no need to use a binder when the charge-transporting material is of a high-polymer which is capable of serving as a binder itself. A photosensitive member embodying this invention can be formed by overlaying an electroconductive substrate with a charge-transporting layer and thereupon with a charge-generating layer in the same manner as the photosensitive member in FIG. 3.

A photosensitive member of the dispersion type, which consists of an electroconductive substrate overlaid with a photosensitive layer in the same manner as the photosensitive member in FIG. 1, is produced by dispersing fine particles of a photoconductive material in a solution of a hydrazone compound and a resin and by coating an electroconductive substrate with a coating material thus prepared, followed by drying, so as to form a photosensitive layer. The photosensitive layer should have a thickness in the range 3–30 μm, preferably 5–20 μm. The quantity of the photoconductive material in the photosensitive layer should have a proportion of 0.01–2 parts by weight, preferably 0.05–1 parts by weight, against one part by weight of the resin. The sensitivity is poort if the photoconductive material is used in an insufficient quantity whereas the chargeability is poor and the mechanical strength of the photosensitive layer are inadequate if used to excess. It is suitable for the hydrazone compound to be used in a quantity in the range 0.01–2 parts by weight, preferably 0.02–1.2 parts by weight, against one part by weight of the resin. A photoconductive material of a high-polymer, such as polyvinyl carbazole, which is capable of serving as a binder itself can be used in combination. Other charge-transporting materials can also be used in combination.

Applicable as a photoconductive material to the production of a photosensitive member of the present invention are, among organic substances, bisazo pigment, triarylmethane dye, thiazine dye, oxazine dye, xanthene dye, cyanine colorant, styryl colorant, pyrylium dye, azo pigment, quinacridone pigment, indigo pigment, perylene pigment, polycyclic quinone pigment, bisbenzimidazole pigment, indanthrone pigment, squalilium pigment, phthalocyanine pigment, etc., and, among inorganic substances, selenium, selenium-terrulium, selenium-arsenic, cadmium sulfide, amorphous silicon, etc. Besides these named, any material which absorbs light and generates a charge carrier with a high efficiency can be used.

Applicable as a binder in the practice of this invention are any of thermoplastic resins and thermosetting resins which are publicly known to be electrically insulative and any of photocuring resins and photoconductive resins.

Some examples of suitable binders are, among thermoplastic resins, saturated polyester, polyamide, acrylic, ethylene-vinyl acetate copolymer, ion cross-linked olefin copolymer (ionomer), styrene-butadiene block copolymer, polyacrylate, polycarbonate, vinyl chloride-vinyl acetate copolymer, cellulose ester, polyimide, styrol, etc., and, among thermosetting resins, epoxy, urethane, silicone, phenolic, melamine, xylene, alkyd, thermosetting acrylic, etc., and photocuring resins, and photoconductive resins, such as poly-N-vinyl carbazole, polyvinyl pyrene, polyvinyl anthracene, etc., all named without any significance of restricting the use to them. Any of these resins can be used singly or in combination with other resins.

It is desirable for any of these electrically insulative resins to have a volume resistance of $1 \times 10^{12}$ Ω·cm or more when measured singly. Most preferable of all are polyester, polycarbonate and acrylic.

A photosensitive member embodying this invention permits, in combination with the binder, the use of a plasticizer, such as halogenated paraffin, polybiphenyl chloride, dimethyl naphthalene, dibutyl phthalate or 0-terphenyl, the use of an electron-attractive sensitizer, such as chloranyl, tetracyanoethylene, 2,4,7-trinitro-9-fluorenone, 5,6-dicyanobenzoquinone, tetracyanoquinodimethane, tetrachlorphthalic anhydride, or 3,5-dinitrobenzoic acid, and the use of a sensitizer, such as methyl violet, rhodamine B, cyanine dye, pyrylium salt, and thiapyrylium salt.

A photosensitive member thus formed may have an intermediate layer (adhesion layer) (8), or a surface-protective layer (7) as shown by FIGS. 4 and 5, as occasion demands.

A photosensitive member of the present invention shows, by virtue of a hydrazone compound contained therein as explained in the foregoing description, an excellent charge-transporting ability, stable initial surface potential, and reduced dark reduction rate which involves no practical problems, and a satisfactory chargeability, and furthermore shows, by virtue of the improvement in charge-transporting ability, less traps for the carrier, a high sensitivity, and reduced deterioration through fatigue even after repeated use.

EXAMPLES OF SYNTHESIS OF ENAMINE COMPOUND (Synthesis of the Compound (5))

4.24 g (0.01 ml) of a dibornyl substance represented by the following formula:

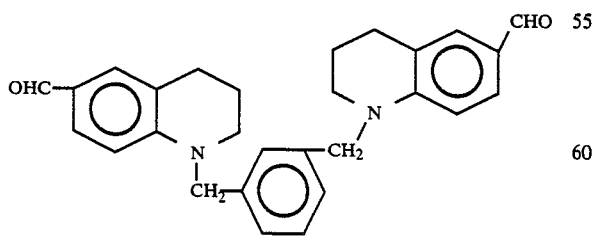

and 4.41 g (0.02 ml) of diphenylhydrazine hydrochloride and 4.0 g of potassium acetate were dissolved in 200 ml of ethanol. The reacting liquid was heated for two hours under reflux by heating. After the reaction the liquid was filtered and cooled so that crystals were separated. Then by screening the crystals and cleaning time with methanol, followed by drying, 6.40 g of a hydrazone compound (5) was obtained (85% yield). By recrystallization refining of the product with ethyl acetate-methanol the synthesis eventually gave yellow crystals with a melting point of 116°–118° C.

EXAMPLE 1

One part by weight of chlorodiane blue represented by the following general formula (A)

General formula

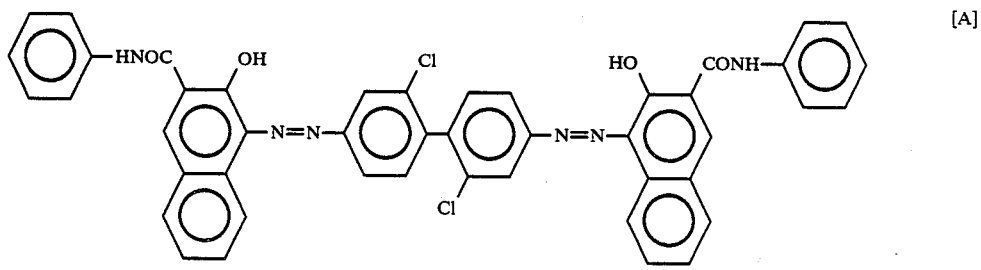

and one part by weight of polyester resin ("Vylon 200" made by Toyobo) and 50 parts by weight of tetrahydrofuran were taken in a ball-mill pot for dispersion for 24 hours and a photosensitive coating liquor was obtained. An aluminum substrate was coated with this liquor, and after drying, a charge-generating layer with a thickness of 1 μm was formed thereon. This charge-generating layer was coated with a liquid coating prepared by dissolving 10 parts by weight of the hydrazone compound (1) and 10 parts by weight of polycarbonate resin ("Panlite K-1300" made by Teijin Chemicals) in 80 parts by weight of tetrahydrofuran, and after drying, a charge-transporting layer with a thickness of 20 μm was formed.

The photosensitive member thus formed was tested with an electrophotographical copying machine available on the market (made by Minolta Camera, EP450Z) to determine, for a corona charge at −6.0 KV, the initial potential Vo(v), exposure $E_{\frac{1}{2}}$ (lux.sec) required to reduce the initial potential to a half, and the reduction rate $DDR_5$(%) of the initial potential after being left in the dark for five seconds.

EXAMPLES 2–4

Photosensitive members which are structurally the same as in Example 1 were made in the same manner, except that the hydrazone compounds (2), (5) and (6) were used instead of the hydrazone compounds (1).

The photosensitive members thus formed were tested in the same manner as in Example 1 to determine Vo, $E_{\frac{1}{2}}$ and $DDR_5$.

EXAMPLE 5

Two parts by weight of disazo pigments represented by the following general formula (B)

General formula:

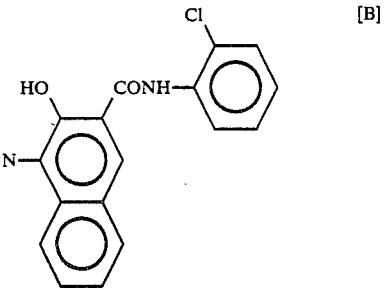

[B]

and one part by weight of polyester resin ("Vylon 200" made by Toyobo) and 100 parts by weight of methyl ethyl ketone were taken in a ball-mill pot and, after dispersion for 24 hours, a coating preparation of a photosensitive substance was obtained. An aluminium substrate was coated with said coating preparation, and, after drying, a charge-generating layer with a thickness of 1 μm was formed thereon.

The charge-generating layer thus formed was coated with a liquid coating prepared by dissolving 10 parts by weight of the hydrazone compound (7) in the foregoing description and 10 parts by weight of polyacrylate resin ("U-100" made by Unitika) in a solvent of 100 parts by weight of chlorobenzene, and, after drying, a charge-transporting layer with a thickness of 20 μm was formed.

The photosensitive member thus obtained was tested in the same manner as in Example 1 to determine $V_0$, $E_{\frac{1}{2}}$ and $DDR_5$.

EXAMPLES 6–7

A photosensitive member which was structurally the same as in Example 5 was formed in the same manner, except that the hydrazone compounds (8) and (9) were used instead of the hydrazone compound (7).

The photosensitive member thus obtained was tested in the same manner as in Example 1 to determine $V_0$, $E_{\frac{1}{2}}$ and $DDR_5$.

EXAMPLE 8

50 parts by weight of copper phthalocyanine and 0.2 parts by weight of tetranitro-copper-phthalocyanine were dissolved in a 500 parts by weight of concentrated 98% sulfuric acid with a good stirring, and the solution was poured into 5,000 parts by weight of water so that a composition of photoconductive material composed of copper phthalocyanien and tetranitro-copper-phthalocyanine was separated therein. After filtering, said composition was rinsed with water and dried at 120° C. under reduced pressure.

10 parts by weight of the photoconductive composition thus obtained, 22.5 parts by weight of thermosetting acrylic resin ("Acrydic A405" made by Dainippon Ink & Chemicals), 7.5 Parts by weight of a melamine resin ("Super Beckamine J820" made by Dainippon Ink & Chemicals), and 10 parts by weight of the hydrazone compound (12), together with a 100 parts by weight of a mixed solvent composed of methyl ethyl ketone and xylene in equal quantities, were all taken in a ball-mill pot to form, by dispersion for 48 hours, a liquid coating of photoconductive material. The liquid coating thus obtained was applied to an aluminum substrate, and, after drying, a photosensitive member overlaid with a photosensitive layer wth a thickness of approximately 15 μm was formed.

The photosensitive member thus obtained was tested to determine $V_0$, $E_{\frac{1}{2}}$ and $DDR_5$ in the same manner as in Example 1, except that the corona charge was +6 KV.

EXAMPLES 9–10

Photosensitive members which were structurally the same as in Example 8 were formed in the same manner, except that the hydrazone compound (15) and the azine compound (19) were used instead of the hydrazone compound (12).

The photosensitive members thus obtained were tested in the same manner as in Example 8 to determine $V_0$, $E_{\frac{1}{2}}$ and $DDR_5$.

EXAMPLES 11–12

Photosensitive members which were structurally the same as in Example 8 were formed in the same manner, except that the azine compounds (21) and (25) were used instead of the hydrazone compound (12).

The photosensitive member thus obtained were tested in the same manner as in Example 8 to determine $V_0$, $E_{\frac{1}{2}}$ and $DDR_5$.

The list in Table 1 shows the results of the tests with respect to $V_0$, $E_{\frac{1}{2}}$ and $DDR_5$ of the photosensitive members in Examples 1 through 12.

TABLE 1

|  | $V_0$ (V) | $E_{2/1}$ (lux · sec) | $DDR_5$ (%) |
|---|---|---|---|
| Example 1 | −660 | 6.3 | 4.5 |
| Example 2 | −650 | 5.5 | 5.0 |
| Example 3 | −660 | 5.0 | 4.0 |
| Example 4 | −670 | 4.5 | 3.0 |
| Example 5 | −650 | 3.2 | 5.5 |
| Example 6 | −640 | 3.5 | 6.0 |
| Example 7 | −650 | 3.7 | 5.0 |
| Example 8 | +630 | 2.3 | 11.0 |
| Example 9 | +640 | 2.0 | 10.5 |
| Example 10 | +630 | 2.5 | 11.0 |
| Example 11 | +640 | 2.9 | 12.0 |
| Example 12 | +650 | 2.7 | 10.0 |

As will be understood from Table 1, a photosensitive member embodying the present invention has $V_0$ of 600 V or more, small $DDR_5$, and shows an excellent chargeability and a satisfactory sensitivity. Also in a copying test under repeated positively polarized charge with a copying machine, to which the photosensitive members H-J of Examples 5 and 6 were subjected, 10,000 copies were obtained with clear images, excellent in gradation effect both initially and finally, and without change in sensitivity.

What is claimed is:

1. A photosensitive member containing a hydrazone and/or an azine compound represented by one of the following general formulaes (I) and (II):

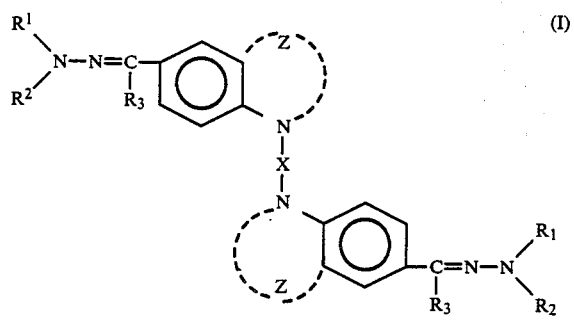

wherein $R_1$ and $R_2$ independently are any of alkyl group, aralkyl group, aryl group and heterocyclic group, where each group may have a substituent; $R_1$ and $R_2$ may combinedly form a ring; $R_3$ is any of a hydrogen atom, alkyl group, aralkyl group, aryl group and heterocyclic group, where the aralkyl group, aryl group and heterocyclic group may have a substituent; X is represented by the formula:

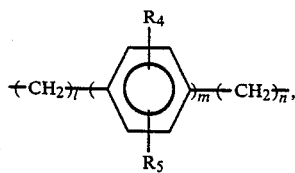

wherein $R_4$ and $R_5$ independently are any of a hydrogen atom, halogen atom, alkyl group, alkoxy group, aralkyl group, aryl group, aryloxy group, and aralkyloxy group, where each group may have a substituent; l and n independently are an integer 0 through 6; m is an integer 0 through 2; and Z is a heterocyclic group forming a ring containing a nitrogen atom, which may have a substituent;

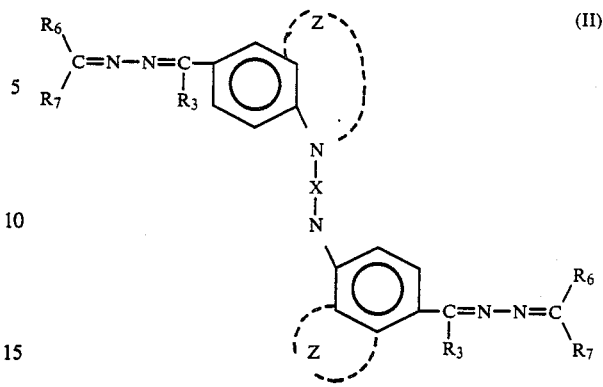

Wherein $R_3$, X and Z are the same as in (I); $R_6$ and $R_7$ independently are any of a hydrogen atom, alkyl group, aryl group and heterocyclic group, where each group may have a substituent; and $R_6$ and $R_7$ may combinedly form a ring and further comprising a photoconductive material.

2. The photosensitive member of claim 1, in which the group represented by the formula:

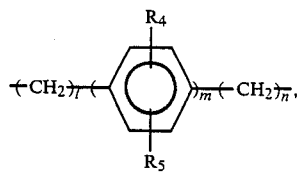

is selected from the group consisting of 1,6-quinolinyl group, 1,5-indolinyl group and 1,5-benzoimidazolyl.

3. The photosensitive member of claim 1, in which $R_1$ and $R_2$ are independently phenyl, methyl, ethyl, benzyl, methoxy phenyl and ethoxy phenyl which may have a substituent, except that both $R_1$ and $R_2$ are not hydrogen atoms.

4. The photosensitive member of claim 1, in which $R_6$ and $R_7$ are independently phenyl, methyl, ethyl, benzyl, methoxy phenyl and ethoxy phenyl, dialkylaminophenyl, diphenylaminophenyl, N-methyl benzothiazolinyl, N-methyl benzoxazolinyl group, which may have a substituent.

5. The photosensitive member of claim 1, which consists essentially of a photosensitive layer comprising the hydrazone compounds and/or azine comound dissolved or dispersed together with a photoconductive material in a binder on a electroconductive substrate.

6. The photosensitive member of claim 1, which consists essentially of a charge generating layer, a charge transporting layer and an electroconductive substrate wherein the charge transporting layer consists of the hydrazone compound and/or azine compound dispersed in a binder.

7. The photosensitive member of claim 6, in which the hydrazone compounds and/or azine compound is contained at a proportion of 0.02–2 parts by weight against one part by weight of the binder.

8. The photosensitive member of claim 6, in which the thickness of the charge generating layer is about 3–30 micron meters, and the thickness of the charge transporting ayer is not more than 4 micron meters.

* * * * *